US006657779B2

(12) United States Patent
Cavaliere et al.

(10) Patent No.: US 6,657,779 B2
(45) Date of Patent: Dec. 2, 2003

(54) OPTICAL TRANSMISSION SYSTEM

(75) Inventors: Fabio Cavaliere, Cosenza (IT); Edoardo Mongiardini, Genoa (IT)

(73) Assignee: Marconi Communications S.p.A., Genoa (IT)

( * ) Notice: Subject to any disclaimer, the term of this patent is extended or adjusted under 35 U.S.C. 154(b) by 0 days.

(21) Appl. No.: 09/928,252

(22) Filed: Aug. 10, 2001

(65) Prior Publication Data

US 2002/0044340 A1 Apr. 18, 2002

(30) Foreign Application Priority Data

Aug. 18, 2000 (IT) ...................... TO2000A0808

(51) Int. Cl.[7] ............................................. H04B 10/12
(52) U.S. Cl. ................. 359/341.4; 359/341.3; 359/337; 359/337.4
(58) Field of Search ................... 359/337, 337.13, 359/341.4, 333, 337.4, 341.3

(56) References Cited

U.S. PATENT DOCUMENTS

| 5,623,362 | A | * | 4/1997 | Mitsuda et al. ......... 359/341.33 |
| 6,069,718 | A | * | 5/2000 | Khaleghi .................... 359/110 |
| 6,366,376 | B1 | * | 4/2002 | Miyata et al. ............... 359/124 |
| 6,384,963 | B2 | * | 5/2002 | Ackerman et al. ........... 359/334 |
| 2001/0024307 | A1 | * | 9/2001 | Franco et al. ................ 359/161 |
| 2001/0036347 | A1 | * | 11/2001 | Hansen et al. .............. 385/123 |
| 2002/0154389 | A1 | * | 10/2002 | Vasilyev et al. .......... 359/341.3 |

* cited by examiner

*Primary Examiner*—Thomas G. Black
*Assistant Examiner*—Stephen Cunningham
(74) *Attorney, Agent, or Firm*—Kirschstein, et al.

(57) ABSTRACT

Data transmitted on optical fiber over long distances is subject to the introduction of errors at the receiving end, caused by distortions and alterations of the original data. Raising the transmission power to increase the level of signals at the receiving end also increases errors due to non-linear characteristics of the fiber. The invention optimizes launch power by assessing error rates due to amplified spontaneous emissions and due to four wave mixing, so that signal to noise ratios due to these causes exceed threshold levels while enabling launch power to be maximized.

3 Claims, 3 Drawing Sheets

OSNR=17 dB

Noise and Signal Propagation

OPTICAL TRANSMISSION SYSTEM

Figure 1:
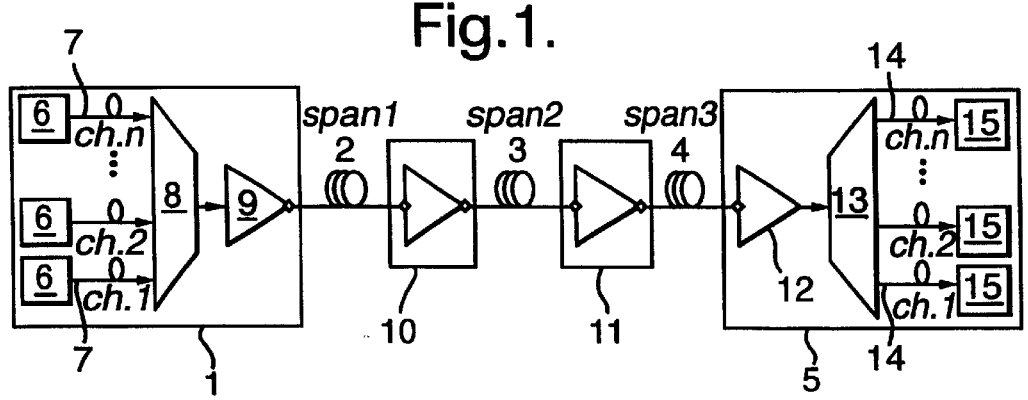

This invention relates to an optical transmission system in which communication signals are sent over a common optical fiber path at different wavelengths, or colours. Such a system is termed wavelength division multiplex (WDM), and it permits efficient use of an optical fiber path.

Fiber group velocity dispersion was the most significant problem when single channel systems, operating near the minimum of fiber attenuation (about 1550 nm), were introduced some years ago. To overcome this problem, dispersion-shifted fibres were designed, having the minimum of group velocity dispersion occurring near 1550 nm. Fiber of this kind has been widely installed for optical transport networks. The introduction of the optical amplifier and progresses in lasers manufacturing now makes it possible to carry many high bit-rate channels on very long distances at different wavelengths (WDM). Unfortunately non-linear fiber behaviour is significant at high powers boosted into the fiber by optical amplifiers and has a big impact on bit error rates (BER) performances, giving rise to cross talk among channels.

It has proved difficult substantially to raise the power of optical signals which are launched into a WDM system without causing an unacceptable bit error rate.

The present invention seeks to provide a method of operating an optical transmission system in a more efficient manner.

According to a first aspect of this invention, a method of determining the launch power of a WDM optical transmission system having a plurality of sequential amplified spans which together form a link includes the step of setting the amplifier power at each amplifier at or near the same maximum value at which both the optical signal to noise ratio due to amplified spontaneous emission ($OSNR_{ase}$) and the optical signal to noise ratio due to four wave mixing ($OSNR_{fwm}$) each are above respective predetermined threshold values at the end of the link.

For a given launch power at the beginning of each span of the link the actual values of $OSNR_{ase}$ and $OSNR_{fwm}$ are inter-related, and preferably an iterative process is used to determine the optimum maximum launch power which does not give rise to an unacceptably high bit error rate.

According to a second aspect of this invention, a method of determining the launch power of a WDM optical transmission system having an amplified link includes the steps of (a) setting the amplifier power at the beginning of the link,
(b) determining the signal to noise ratio due to amplified spontaneous emission ($OSNR_{ase}$) and the optical signal to noise ratio due to four wave mixing ($OSNR_{fwm}$) at the end of the link,
(c) comparing each of $OSNR_{ase}$ and $OSNR_{fwm}$ with a respective predetermined threshold value,
(d) altering the amplifier power,
(e) repeating steps (b), (c) and (d) until the amplifier power is at or near a maximum value whilst both $OSNR_{ase}$ and $OSNR_{fwm}$ exceed the respective threshold values.

Preferably the link includes a plurality of sequential amplified spans, in which case preferably each amplifier power is at the same value.

Figure 2:
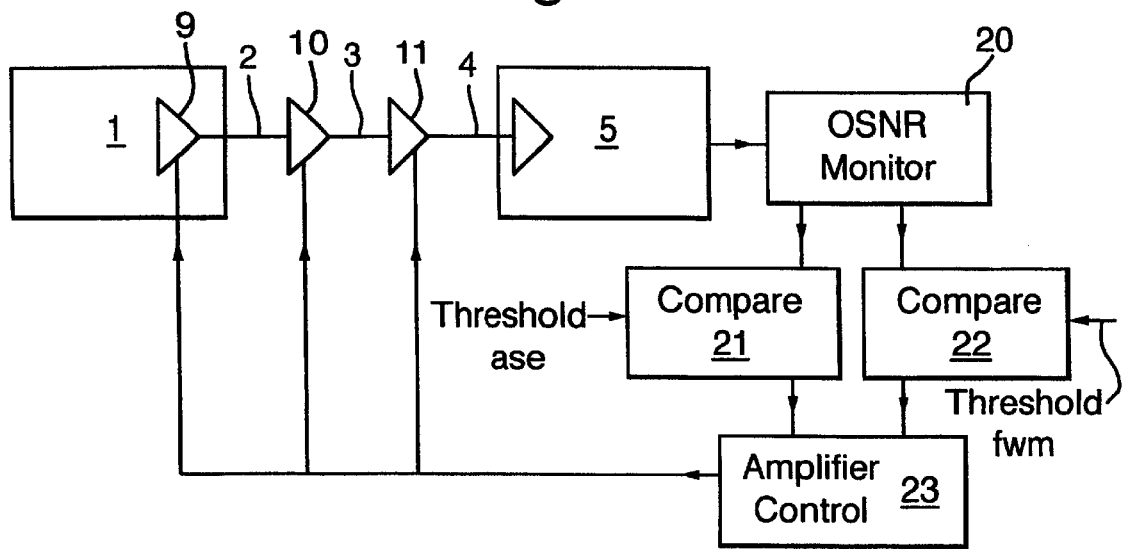
Figure 3:
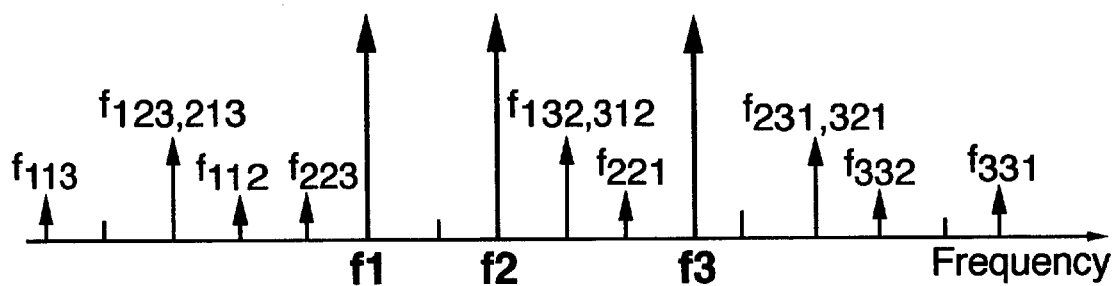
Figure 4:
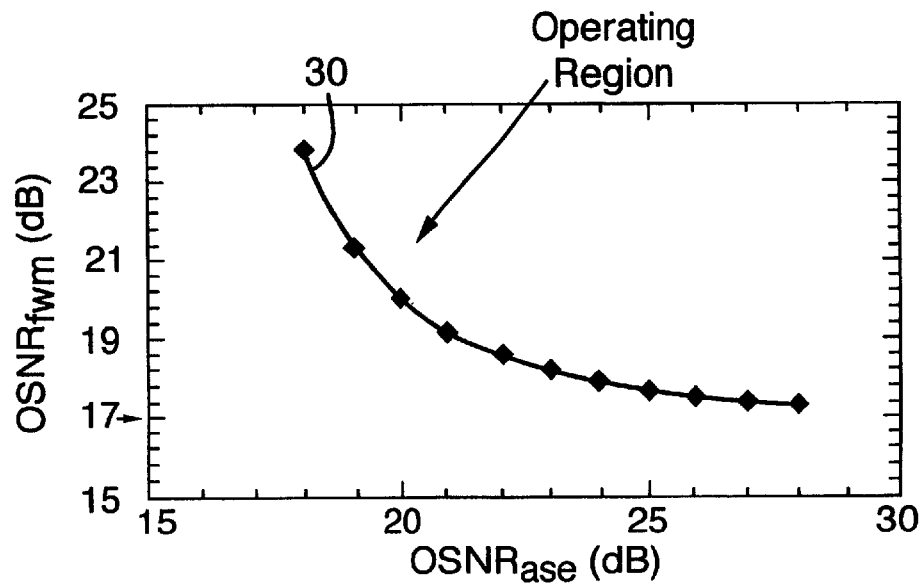
Figure 5:
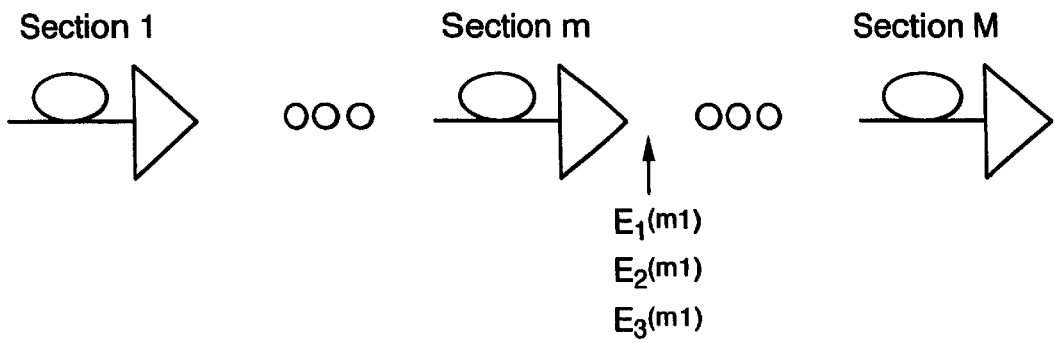
Figure 6:
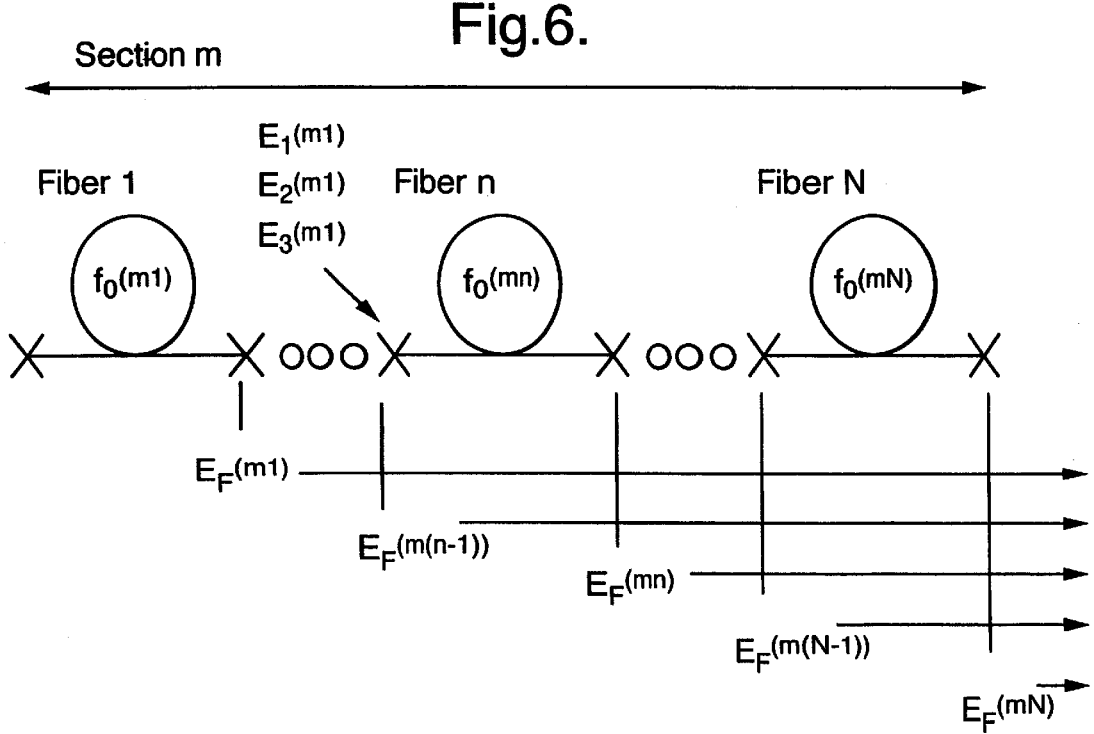
Figure 7:
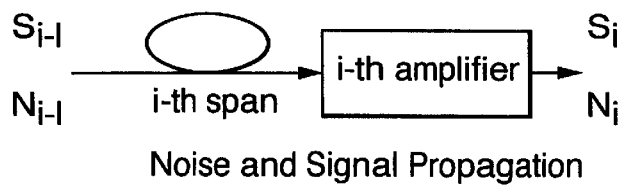

The invention is further described by way of example with reference to the accompanying drawings, in which:

FIG. 1 shows an WDM optical transmission system,
FIG. 2 shows such a system adapted to perform the invention,
FIGS. 3 and 4 are explanatory diagrams,
FIGS. 5 and 6 area diagrams relating to the calculation of $OSNR_{fwm}$ and
FIG. 7 is a diagram relating to the calculation of $OSNR_{ase}$.

Referring to FIG. 1, the WDM optical transmission system consists of an optical transmitter arrangement 1 which transmits a WDM optical signal over a link consisting of three spans 2, 3, 4 to an optical receiver arrangement 5. The transmitter arrangement has a number of individual optical signal transmitters 6, each generating an optical channel signal at a different wavelength. These channel signals are sent over fibres 7 of a multiplexer 8 where they are combined, whilst preserving the carrier wavelength of each channel, and are launched by a high power amplifier 9 over the optical fiber which comprises the first span 2. Optical amplifiers 10 and 11 amplify the optical signals for onward transmission over spans 3 and 4 respectively for reception at receiver arrangement 5.

An input amplifier 12 amplifies the received optical channels prior to them being demultiplexed, ie separated out, by demultiplexer 13 and sent over separate fibers 14, each of which carries a single optical channel, to respective receivers 15.

It is often required that the spans 2, 3, 4 are of considerable length, perhaps several hundred kilometers, and so it is necessary to launch the optical signals at high power over each span to allow for the signal attenuation which inevitably occurs in a long fiber. Optical signals suffer distortion and dispersion when transmitted over an optical to fiber.

Referring to FIG. 2, at the optical receiver arrangement 5, the received optical signal is monitored by an OSNR monitor 20 which calculates the values of $OSNR_{ase}$ and $OSNR_{fwm}$. These values are compared at comparators 21 and 22 with respective threshold values of $OSNR_{ase}$ and $OSNR_{fwm}$ which represent the minimum acceptable values for the link. The results of the comparisons are passed to an amplifier control unit 23, which acts to adjust the amplifier power of amplifiers 9, 10 and 11.

FWM is the dominant non-linear effect in WDM systems working on dispersion-shifted fibers. It is a non-linear process in which three waves at frequencies $f_i$, $f_j$, $f_k$ ($k \neq i, j$) interact in the optical fiber to generate a new wave at the frequency:

$$f_{ij}f_i + f_j - f_k$$

FIG. 3 shows new frequencies which are generated by Four Wave Mixing (FWM). Two phenomena can affect the detection of the digital signal:

(1) Power depletion: channel power is partially transferred to the FWM frequency.
(2) Cross talk: the FWM frequency coincides with one or more of the transmitted channels.

The cross talk is an important impairment in WDM systems and it can be shown that it rises when fiber dispersion is low, as happens in dispersion shifted fibers and it is proportional to the third power of channels power.

A currently applied solution to avoid FWM cross talk is to arrange the channel frequencies so that no mixing product falls on any of the channels. This condition can be satisfied only if the channels are unequally spaced. The use of unequal channel spacing required a greater bandwidth than for equally spaced channels for a given number of channels.

The invention allows carrying a number of channels greater than that which is apparent from a consideration of the FWM effect, using the same amplifiers on standard systems, without the need to change transmitting and optical filter specifications.

The proposed rule to decide what is the amount of cross talk that is possible to tolerate in WDM systems working on dispersion shifted fiber is based on the following equation:

$$OSNR = (OSNR_{ase}^{-1} + OSNR_{fwm}^{-1})^{-1}$$

Where:
$OSNR_{ase}$ is the ratio between the channel power and the Amplified Spontaneous Emission Power. It <u>rises</u> linearly with channels power.

$OSNR_{fwm}$ is the ratio between a channel power and the sum of powers of all FWM products that falls on the channel. On standard fibers its value is zero. It <u>decreases</u> with the second power of channels power.

This equation considers ASE and FWM as additive independent noise contributes. A trade-off is necessary to find the channels power that minimizes both of them.

To determine the maximum permitted power at the start of each span, the steps are as follows:

1. Choose an OSNR value so that the system can work with a sufficient margin to operate with a selected BER value. This is done by choosing the same working point on standard fiber. FIG. 3 shows a working curve for a fixed value of OSNR, showing the contributions from $OSNR_{ase}$ and $OSNR_{fwm}$. An acceptable system operates to the top right side of the curve. For stability it is preferred to operate close to the top end 30 of the curve.
2. Set the amplifier output powers for amplifiers 9, 10, 11 to arbitrary levels. Preferably each output power is the same for all amplifiers and is close to or at its maximum value.
3. Calculate the $OSNR_{ase}$ at receiver 5.
4. Check that $OSNR_{ase}$ value is greater than the OSNR target value selected in step 1. If it is, go to step 5, otherwise increase amplifier output powers and return to step 3.
5. Calculate the $OSNR_{fwm}$.
6. Check that it is greater than the OSNR target value selected in step 1. If it is, go to step 8, otherwise go to step 7.
7. Replace an amplifier with a regenerator, thereby breaking the link into two sections and restart the procedure from step 1. If this is impossible, the link is not feasible.
8. Calculate the OSNR from the values of $OSNR_{ase}$ and $OSNR_{fwm}$.
9. if it is equal to or larger than the target OSNR value, the link is feasible. Otherwise, if $OSNR_{ase}$ is greater than the OSNR target value, decrease the amplifier output powers and go back to step 3, or if the $OSNR_{ase}$ is less than the OSNR target value go to step 7.

Referring to FIGS. 5 and 6 for the calculation of $OSNR_{fwm}$, total transmission line consists of M sections and (M−1) in-line amplifiers. The repeater span is equal throughout the transmission: this is a good approximation, because the FWM is efficient only in first kilometers of each span, where channel power is higher. Thus it is not dependent on span length. The gain of each amplifier is adjusted to compensate the transmission loss of the section just before the amplifier: this is the actual situation, When all amplifiers are working in saturation regime. Thus, the signal power output from an in-line amplifier, i.e., fiber input power, is equal for each section. One section consists of N fiber lengths with different zero-dispersion wavelength, which is assumed to be uniform along one length. The length of each fiber is equal. For this system configuration, FWM light at $f_F = f_1 + f_2 - f_3$ is evaluated, where $f_1$, $f_2$ and $f_3$ are the light frequencies of transmitted signals. The polarisation states of each light are assumed to be matched throughout the transmission.

The following notations are provided for the above system configuration:

1. M Number of sections
2. N Number of fibers in one section
3. $L_0$ Length of one fiber
4. $L = NL_0$ Length of one section
5. $\alpha$ Fiber loss coefficient
6. $\kappa$ Constant representing FWM efficiency at the phase matched condition
7. $E_1^{(mn)}$ $f_1$ light field at the beginning of Fiber n in Section m.
8. $E_2^{(mn)}$ $f_2$ light field at the beginning of Fiber n in Section m.
9. $E_3^{(mn)}$ $f_3$ light field at the beginning of Fiber n in Section m.
10. $E_F^{(mn)}$ FWM light field at the beginning of Fiber n in Section m.
11. $\beta_1^{(mn)}$ Propagation constant for $f_1$ in Fiber n in Section m
12. $\beta_2^{(mn)}$ Propagation constant for $f_2$ in Fiber n in Section m
13. $\beta_3^{(mn)}$ Propagation constant for $f_3$ in Fiber n in Section m
14. $\beta_F^{(mn)}$ Propagation constant for FWM in Fiber n in Section m
15. $\Delta\beta^{(mn)} = \beta_1^{(mn)} - \beta_2^{(mn)} - \beta_2^{(mn)} - \beta_F^{(mn)} =$ 16. $= -\dfrac{\pi^4}{c^2} S \cdot \{(f_1 - f_0^{(mn)}) + (f_2 - f_0^{(mn)})\} \times (f_1 - f_3) \cdot (f_2 - f_3)$ 17. S is the dispersion slope
18. $f_0^{(mn)}$ Zero-dispersion frequency of Fiber n in Section m.

19. $\phi_1^{(m)} = \sum_{n=1}^{N} \beta_1^{(mn)} L_0$

20. $\phi_2^{(m)} = \sum_{n=1}^{N} \beta_2^{(mn)} L_0$

21. $\phi_3^{(m)} = \sum_{n=1}^{N} \beta_3^{(mn)} L_0$

22. $\phi_F^{(m)} = \sum_{n=1}^{N} \beta_F^{(mn)} L_0$

23. $\Delta\phi(m) = \Delta\phi_1^{(m)} + \Delta\phi_2^{(m)} + \Delta\phi_3^{(m)} - \Delta\phi_F^{(m)}$ The final FWM power is:

$$P_{FWM} = \dfrac{1024\pi^6}{n_0^4 \lambda^2 c^2}(D\chi)^2 \dfrac{P_1 P_2 P_3}{A_{\it Eff}^2} e^{-\alpha L}$$

$$\left| \sum_{m=1}^{M} \exp\left[i \sum_{k=1}^{m-1} \Delta\phi^{(k)}\right] \right| \times$$

-continued $$\sum_{n=1}^{N} \exp\left[\sum_{j=1}^{n-1}(-\alpha+i\Delta\beta^{(mj)})L_0\right] \times$$

$$\left.\frac{1-\exp[(-\alpha+i\Delta\beta^{(mn)})L_0]}{-\alpha+i\Delta\beta^{(mn)}}\right|^2$$

Usually $f_0^{(mn)}$ are modelled as random variables gaussian distributed. Thus, $P_{fwm}$ also will be a random variable whose distribution can be found using a Montecarlo procedure.

In DWDM systems with Nch channels, the $OSNR_{fwm}$ relative to the m-th channel will be:

$$OSNR_{FWM}^{(m)} = \frac{P^{(m)}}{\sum_{\substack{i,j,k=1 \\ i+j-k=m, \\ i,j\neq k}}^{Nch} P_{fwm}^{(i,j,k)}} \quad m=1,\ldots,Nch$$

Where $P^{(m)}$ is the power of the mth channel $P_{fwm}^{(i,j,k)}$ is the FWM power generated by channels i-th, j-th and k-th, calculated according to $$P_{FWM} = \frac{1024\pi^6}{n_0^4\lambda^2c^2}(D\chi)^2\frac{P_1P_2P_3}{A_{Eff}^2}e^{-\alpha L}$$

$$\left|\sum_{m=1}^{M} \exp\left[i\sum_{k=1}^{m-1}\Delta\phi^{(k)}\right] \times \right.$$

$$\sum_{n=1}^{N} \exp\left[\sum_{j=1}^{n-1}(-\alpha+i\Delta\beta^{(mj)})L_0\right] \times$$

$$\left.\frac{1-\exp[(-\alpha+i\Delta\beta^{(mn)})L_0]}{-\alpha+i\Delta\beta^{(mn)}}\right|^2$$

Referring to FIG. 7 for the calculation of $OSNR_{ase}$ each optical amplifier generates ASE noise, according to:

$$ASE = \frac{1}{2}hf_0 \cdot NF(G-1)M_tB_o$$

Where:
ASE is the Amplified Spontaneous Emission noise power (W);
h is the Planck's constants (J·s);
$f_0$ is the working frequency (Hz);
NF is the optical amplifier noise figure;
G is the optical amplifier gain;
$M_t$ is the number of polarisation states (M=1 or 2);
$B_o$ is the optical bandwidth (Hz).

Both NF and G depend on the wavelength and on the total input power.

Signal and noise propagation in an optical link with in line amplifiers can be calculated according to following equations:

Signal propagation: $S_i=G_i\{S_{i-1}-L_i\}-L_i+S_{i-1}$ dBm

Noise propagation: $N_i=G_i\{S_i-1-Li\}-Li+N_{i-1}+ASE_i$ dBm; (i=1 . . . , n)

Where:
$S_i$ is the channel power in dBm after the i-th optical line amplifier (i=1, . . . , n-1);
$S_0$ is the channel power in dBm after the launch booster;
$S_n$ is the channel power in dBm after the final preamplifier;
$N_i$ is the noise power in dBm after the i-th optical line amplifier on a $B_o$ bandwidth around one channel (i=1, . . . , n-1);
$N_0$ is the Noise signal power in dBm per channel generated by the booster, calculated as in Equation 4;
$N_n$ is the Noise power in dBm per channel after the final preamplifier;
$ASE_i$ is the noise generated by the i-th amplifier, calculated as in Equation 4;
$L_i$ is the i-th span Loss (in dB);
$G_i\{\cdot\}$ is the i-th optical amplifier Gain in dB, as a function of the total input power;
n is the number of spans.

Finally,
OSNR (dB)=$S_n$−$N_n$

What is claimed is:

1. A method of determining a launch power of a wavelength division multiplex optical transmission system having an amplified link, comprising the steps of:
   (a) setting an amplifier power at a beginning of the amplified link;
   (b) determining a signal-to-noise ratio due to amplified spontaneous emission ($OSNR_{ase}$) and an optical signal-to-noise ratio due to four-wave mixing ($OSNR_{fwm}$) at an end of the amplified link;
   (c) comparing each of $OSNR_{ase}$ and $OSNR_{fwm}$ with a respective predetermined threshold value;
   (d) altering the amplifier power; and
   (e) repeating steps (b), (c) and (d) until the amplifier power is at or near a maximum value while both $OSNR_{ase}$ and $OSNR_{fwm}$ exceed the respective predetermined threshold values.

2. The method as claimed in claim 1, wherein the amplified link includes a plurality of sequential amplified spans, and wherein the step (d) is performed on each amplifier at the beginning of the amplified link.

3. The method as claimed in claim 2, wherein the amplified power launched into each span is at the same value.

* * * * *